United States Patent [19]

Reed

[11] 4,310,232

[45] Jan. 12, 1982

[54] PHOTOGRAPHIC APPARATUS AND METHOD FOR ADDING ARTIFICIAL BACKGROUNDS

[76] Inventor: Richard F. Reed, 27836 Forestbrook, Farmington Hills, Mich. 48018

[21] Appl. No.: 84,085

[22] Filed: Oct. 12, 1979

[51] Int. Cl.³ .................. G03B 15/10; G03B 11/00
[52] U.S. Cl. ............................... 354/125; 354/291; 354/296
[58] Field of Search ..................... 354/120–125, 354/202, 291, 296; 355/125–126; 352/88–89

[56] References Cited

U.S. PATENT DOCUMENTS

| | | | |
|---|---|---|---|
| 1,170,522 | 2/1916 | Feltenstein | 354/108 |
| 1,543,065 | 6/1925 | Douglass | 354/125 |
| 1,572,315 | 2/1926 | Scholl | 354/296 |
| 1,675,492 | 7/1928 | Hoebner | 355/125 X |
| 1,933,953 | 11/1933 | Ames | 354/291 X |
| 2,866,397 | 12/1958 | Gillette | 354/125 X |
| 3,665,828 | 5/1972 | Reiter | 354/202 |
| 4,149,790 | 4/1979 | Smith | 354/125 |

Primary Examiner—Joseph W. Hartary
Assistant Examiner—Thomas H. Tarcza
Attorney, Agent, or Firm—Harness, Dickey & Pierce

[57] ABSTRACT

A photographic apparatus and method for adding artificial backgrounds. The apparatus is intended to be utilized in combination with a conventional view camera and comprises a control structure including two masking plates pivotably mounted between the film plate and the lens of the camera, which are operable to be placed in either a first operative position against the film plate or a second inoperative position along the sidewall of the camera. A background transparency is attached along with a product mask to one of the plates and a background mask is attached to the other plate. The product and background masks are created from a photograph taken of the product using positive-type film. Once attached to the plates, the two masks are aligned or "registered" with the image of the product projected through the lens of the camera, utilizing the precise alignment means provided for controlling the orientation of the masking plates. The film plate is then exposed twice; once with the plate having the background mask thereon pivoted into its operative position and again with the plate having the background transparency and product mask thereon pivoted into its operative position. The double exposure thus results in a photograph of the product situated in the desired background setting.

10 Claims, 9 Drawing Figures

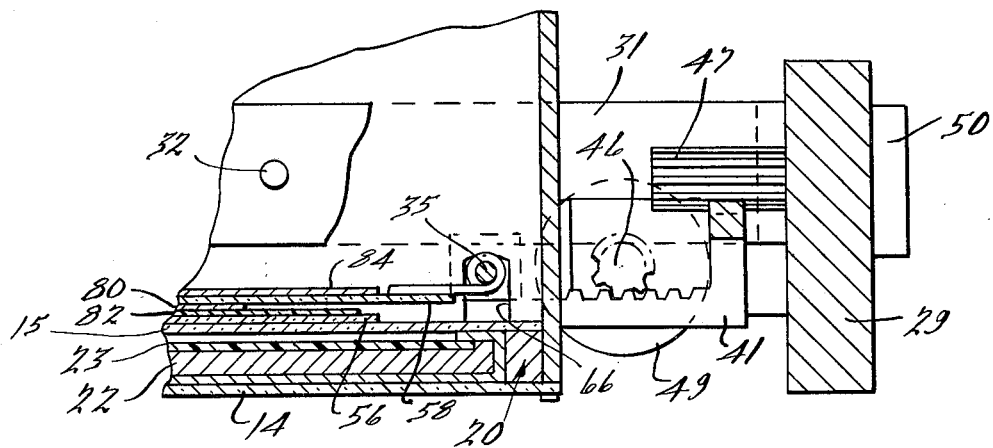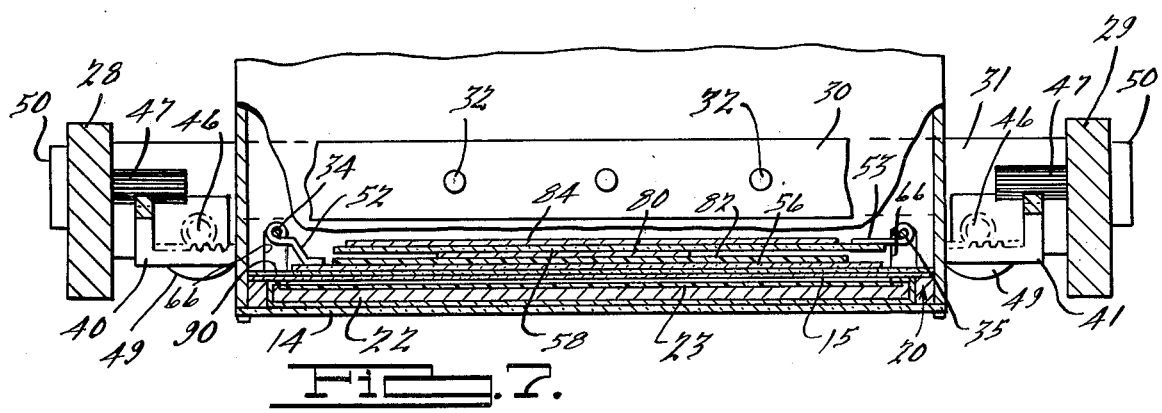

PHOTOGRAPHIC APPARATUS AND METHOD FOR ADDING ARTIFICIAL BACKGROUNDS

BACKGROUND AND SUMMARY OF THE INVENTION

The present invention relates generally to photographic equipment and in particular to photographic apparatus for adding artificial backgrounds to photographs during the photographic process.

Commercial advertisers are resolute to place an advertised product or subject in an atmosphere aesthetically pleasing to a prospective purchaser. Difficulties arise, however, when the background needed to create a desired atmosphere is geographically distant from or out of season in the locale in which the product or subject is located. The difficulty increases with the size of the product advertised. Such advertising may become inordinately expensive if the subject becomes too large, such as a truck or automobile, or impossible in the case of a house or other building if not in the desired season.

The most commonly used technique employed by commercial photographers to overcome this problem involves a process whereby an artificial background is added to a photograph during the developmental stage. However, this process is expensive and time consuming in that it frequently entails a substantial amount of touch-up work to the resulting photograph around the outline of the subject.

Consequently, it is desirable to provide a process for adding an artificial background to a photograph which does not require a significant amount of touch-up work to the resulting photograph. In addition, it is desirable to provide a process which adds the artificial background directly to the film negative; i.e., during the photographic process, rather than during the development of the film negative.

In general, the photographic apparatus of the present invention accomplishes these objectives by providing a conventional view camera that has been modified to add a pair of pivotable masking plates located between the lens and the film cartridge. The masking plates are independently operable to be placed in either a first inoperative position along the sidewall of the camera away from the film cartridge and a second operative position against the film cartridge. The two plates have attached thereto background and product masks respectively which are created from a positive film type photograph taken of the desired product. The product mask however is first applied to a transparency of the desired background scene. Once the masks are attached to the plates, the positions of the plates are oriented via an adjustment apparatus so that the masks on each plate are properly aligned or "registered" with the projection of the product through the lens onto the back plate of the camera. The film negative is then exposed twice, first with the background masking plate in its operative position and secondly with the product masking plate in its operative position. The former exposure is taken of the desired product and the latter exposure is made simply with a white light source in front of the camera lens to expose the film negative to the background transparency. The resulting photograph is remarkably realistic and generally requires minimal touch-up.

Additional objects and advantages of the present invention will become apparent from a reading of the preferred embodiment of the present invention which makes reference to the following set of drawings in which:

BRIEF DESCRIPTION OF THE DRAWINGS

FIG. 3 is an enlarged partial sectional top view of the apparatus of FIG. 2 partially in elevation;

FIGS. 4a, 4b and 4c are diagrammatic top views of a box camera with a device of the present invention attached thereto;

FIG. 7 is a partial top sectional view of an alternative embodiment of the present invention.

DESCRIPTION OF THE PREFERRED EMBODIMENT

Figure 1:
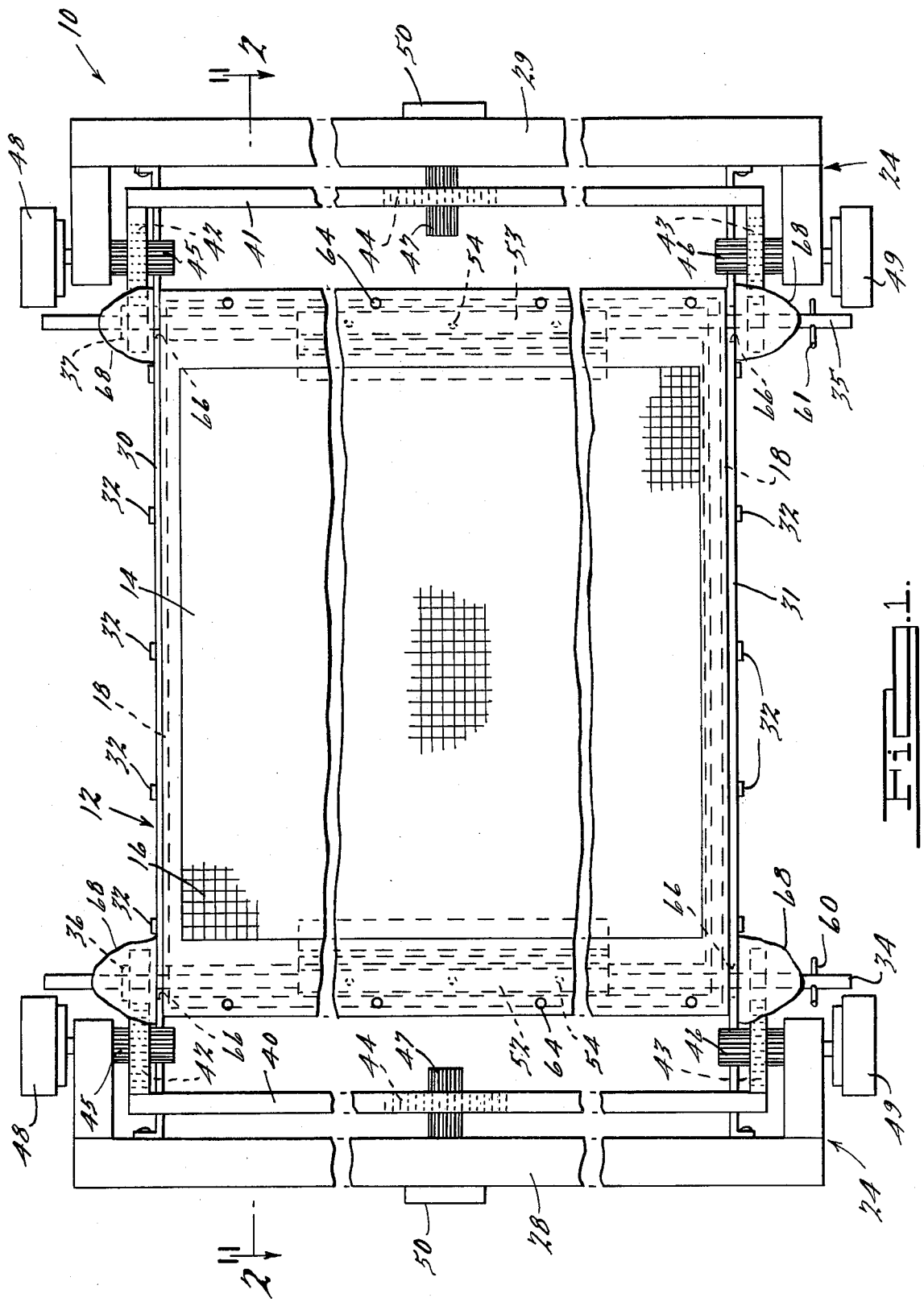
FIG. 1 is an elevated rear view of a box camera having a device of the present invention attached thereto and the film cartridge removed.
Figure 2:
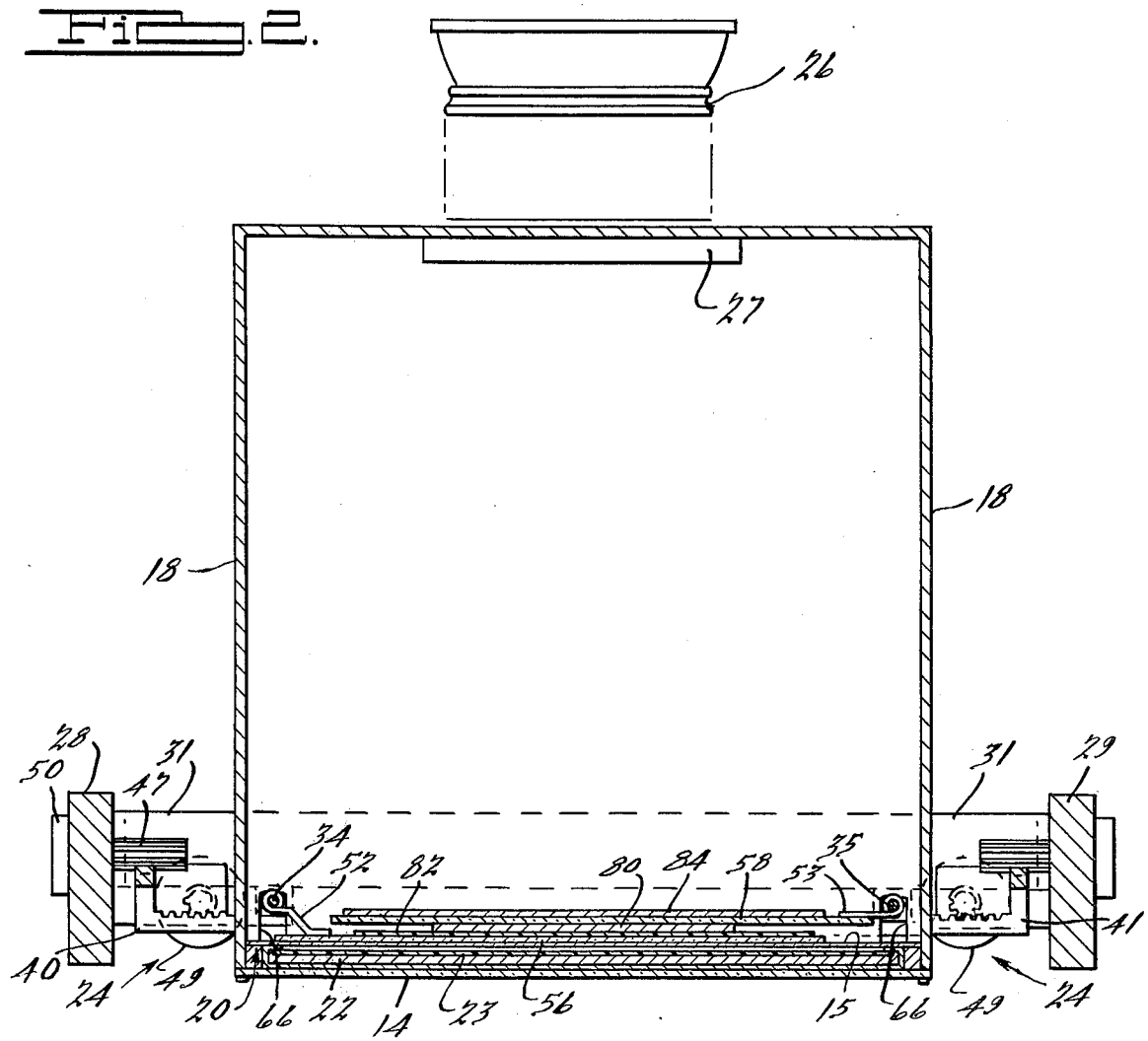
FIG. 2 is a top sectional view along the line 2—2 of FIG. 1.

Referring now to FIGS. 1 and 2, a photographic apparatus for adding artificial backgrounds 10 embodying the principles of the instant invention is shown attached to the rear of a box camera 12 of the type commonly used in commercial photography. At the rear extreme of the camera, a glass plate 14 is attached having a positioning grid 16 superimposed thereon. A support structure 20 shown in FIG. 2 is provided between the glass plate 14 and a second glass plate 15 within the box 18 of the camera 12 that is capable of supporting a replaceable film cartridge 22 having a film plate 23 of either the positive color film type manufactured and sold by Polaroid and Kodak or the conventional negative type film manufactured by Kodak and other manufacturers.

The control apparatus 24 for adding the artificial backgrounds is mounted to the box 18 of the camera 12 between the lens 26 (and shutter 27) and the film cartridge 22. The control apparatus 24 comprises a pair of control arms 28 and 29 which are disposed on either side of the exterior of the camera box 18 secured to the top and bottom of the box 18 by brackets 30 and 31. Control arms 28 and 29 are operatively coupled to a pair of floating support arms, 40 and 41, respectively, which have rotatably journalled thereto a pair of control shafts, 34 and 35 respectively. Control shafts 34 and 35 extend vertically through the camera box 18 along the sidewalls thereof, and are provided with flanges 36 and 37 which rest atop support arms 40 and 41 to prevent downward movement of the shafts. A pair of glass plates 56 and 58 are attached via fasteners 54 to a pair of brackets, 52 and 53 respectively, which are in turn secured by fasteners 64 to control shafts, 34 and 35 respectively. Thus, it will be appreciated that glass plates 56 and 58 are adapted to be pivotable upon rotation of shafts 34 and 35 from first positions along the interior sidewalls of camera box 18 to second positions against the film cartridge 22 at the rear of the camera 12. As best illustrated in FIG. 2, brackets 52 and 53 are offset so that the corresponding glass plates 56 and 58 will set flush against the film plate 23 of the film cartridge 22. In the preferred embodiment, rotation of the control shafts 34 and 35 is provided by manually turning bars, 60 and 61 respectively, attached to control shafts, 34 and 35 respectively.

To control the orientation of the glass plates 56 and 58, the control arms 28 and 29 are connected to the support arms 40 and 41 via three rack and pinion assemblies which control the up/down and side-to-side movement of the support arms 40 and 41. In particular, each support arm 40 and 41 is provided with three racks 42-44, which are engaged to corresponding pinion gears, 45-47 respectively, rotatably journalled to the control arms 28 and 29. Adjustments in the position of the glass plates are thus implemented by manually adjusting the control knobs 48-50 affixed to the shafts carrying pinion gears 45-47.

The control apparatus 24 is installed in the camera box 18 by removing the glass register plate 14 at fasteners 64 and inserting the control shafts 34 and 35 in slots 66 and subsequently securing brackets 30 and 31 to the camera box 18 with fasteners 32. Rubber bellows 68 are attached to the ends of the control shafts 34 and 35 to prevent light from entering the interior chamber of the camera box 18 when the camera is in use.

Figure 5:
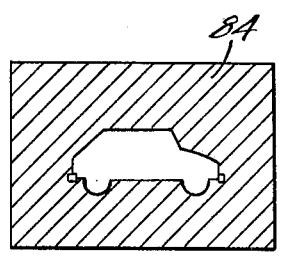
FIG. 5 is an elevated front view of the background mask.
Figure 6:
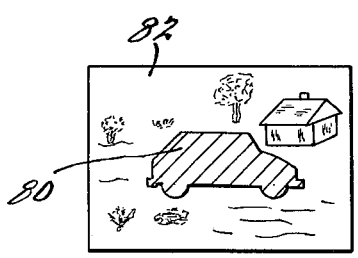
FIG. 6 is an elevated front view of the product mask mounted to a background transparency.

The photographic apparatus 10 of the present invention functions to add an artificial background during the photographic process in the following manner. Preliminarily, it is contemplated that the photographer will have accumulated a variety of background transparencies developed from photographs taken of various desirable background scenes. To add one of these previously photographed background scenes to the photograph of a particular subject, the photographer selects the appropriate background transparency 82 and secures it to glass plate 56. The control apparatus 24 is then installed onto the camera as described above and the glass plates 56 and 58 pivoted to their inoperative positions adjacent the sidewalls of the camera box 18. With the camera 12 placed on a tripod a picture is taken of the product preferably using a film cartridge of the positive color film type manufactured and sold by Polaroid. After the cartridge is removed and the photograph of the product developed, a piece of tracing paper is placed over the photograph and a cut-out of the product is made. The two pieces of tracing paper are then sprayed with a black mat paint to provide two masks, a background mask 84 (FIG. 5) and a product mask 80 (FIG. 6). The product mask 80 is subsequently attached to the background transparency 82 at the position in the background scene where the product is desired to be inserted. Similarly, the background mask 84 is fastened onto glass plate 58 so that the product outline on the background mask 84 is oriented on glass plate 58 in approximately the same position as the product mask 80 on glass plate 56. Alternatively, the product and background masks 80 and 84 respectively can be created utilizing litho-graphic arts film which is a high contrast film that does not produce continuous tones between black and white.

The positions of the product mask 80 and background mask 84 are then "registered" with the image of the product as projected through the lens 26 of the camera 12 onto the register plate 14. This is accomplished by opening the camera shutter 27 and pivoting glass plate 56 into its operative position as illustrated in FIG. 4c, and using the adjustment knobs 48, 49 and 50 to align the product mask 80 with the outline of the image of the product projected onto plate 14. Once product mask 80 is properly registered, glass plate 56 is returned to its inoperative position and glass plate 58 is rotated into its operative position illustrated in FIG. 4b. The outline of the product on background mask 84 is then aligned with the projected image of the product on plate 14 in a similar fashion. The positioning grid 16 on plate 14 is provided to assist the photographer during the registration process.

A film cartridge 22 having an unexposed positive or negative film plate 23 is then placed into the camera. With plate 58 in its operative position illustrated in FIG. 4b, the shutter is opened and a photograph is taken of the product through the background mask 84, exposing only a portion of the film plate 23. Plate 58 is then swung out of position to the side of the box 18 and plate 56 is swung into its operative position between the film plate 23 and the lens 26 (FIG. 4c). A white light source is then set in front of the lens 26 and the shutter again opened to expose the remaining unexposed portion of the film plate to the background transparency 82. The fully exposed film positive or negative 23 is then removed from the camera 12 and developed in the conventional manner. Thus, as will readily be appreciated by those skilled in the art, the resulting photograph will comprise an exceptionally realistic depiction of the product situated in the desired background setting. Moreover, due to the precise means provided for aligning the product and background masks 80 and 84 with the projected image of the photographed product, the resulting photograph will require a minimum amount of touch-up.

Finally, with particular reference to FIG. 7, it is also to be noted that the present photographic apparatus 10 can be readily modified to add a filter 90 against the film plate 23 to provide fog, haze, or other desired atmospheric effect.

Thus, there is disclosed in the above description and in the drawings embodiments of the invention which fully and effectively accomplish the objects thereof. However, it will be apparent that variations in the details of the apparatus and the method may be indulged in without departing from the sphere of the invention herein described, or the scope of the appended claims.

I claim:

1. A photographic apparatus for artificially adding a desired background to a photograph of an inanimate subject during the photographic process, including:
    a camera having a removable film plate, a fixed frame for holding said plate in a fixed position in said camera, and a lens and shutter for exposing said film plate;
    first and second masking plates rotatably supported within said camera and adapted to be positioned in an operative position aligned with said film plate and an inoperative position non-aligned with said film plate;
    a background transparency attached to said first masking plate;
    a subject mask attached to said background transparency;
    a background mask attached to said second masking plate; and
    registration means for controlling the orientation of said masking plates relative to said film plate so that said background and subject masks can be aligned with the projection of the subject through the lens of the camera when said masking plates are in said operative position.

2. A photographic apparatus for adding an artificial background to a subject to be photographed, comprising:
- a camera having a film plate and a lens for controlling the exposure of said film plate;
- a support structure mounted to said camera;
- two control axles rotatably mounted to said support structure and traversing the interior of said camera between said lens and said film plate;
- two clear transparent plates, the first being pivotally mounted to one of the control axles, the second being pivotally mounted to the other of said control axles;
- means for rotating said control axles so that said plates are movable between an operative position aligned with said film plate and an inoperative position non-aligned with said film plate;
- a background transparency attached to said first plate, having a masked area corresponding to the subject being photographed in the desired position on said background transparency;
- a background mask attached to said second plate, having an unmasked area corresponding to the subject being photographed; and
- alignment means mounted to said support structure for aligning said masked area on said background transparency and said unmasked area of said background mask with the projection of said subject through the lens of said camera when said plates are in said operative position.

3. A photographic apparatus for adding an artificial background to the photograph of a subject during the photographic process, including:
- a camera having a film plate and a lens and shutter for controlling the exposure of said film plate;
- a masking plate positionable in an operative position against said film plate and adapted to receive a mask related to said subject; and
- registration means operable independently of said film plate for controlling the orientation of said masking plate relative to said film plate and capable of moving said masking plate along two axes perpendicular to one another and combinations thereof so that said mask can be aligned with the projection of said subject through the lens of said camera when said masking plate is in said operative position.

4. The photographic apparatus of claim 3 wherein said mask comprises a subject mask.

5. A photographic apparatus for adding an artificial background to the photograph of a subject during the photographic process, including:
- a camera having a film plate and a lens and shutter for controlling the exposure of said film plate;
- a masking plate positionable in an operative position against said film plate and adapted to receive a subject mask;
- registration means for controlling the orientation of said masking plate relative to said film plate so that said mask can be aligned with the projection of said subject through the lens of said camera when said masking plate is in said operative position; and
- a second masking plate positionable in an operative position against said film plate and adapted to receive a background mask.

6. The photographic apparatus of claim 5 wherein said registration means is further adapted to control the orientation of said second masking plate relative to said film plate so that said background mask can be aligned with the projection of said product through the lens of said camera when said second masking plate is in said operative position.

7. The photographic apparatus of claim 6 wherein said masking plates are rotatably supported within said camera and selectively movable between said operative position and an inoperative position non-aligned with said film plate.

8. The method of adding an artificial background to the photograph of an inanimate object during the photographic process utilizing a camera having a film plate, a lens and shutter for controlling the exposure of said film plate, first and second masking plates rotatably supported within said camera, and registration means for controlling the orientation of said masking plates relative to said film plate; including the steps of:
- fixing the position of said camera relative to the subject to be photographed,
- creating a subject mask and background mask,
- attaching a transparency of the desired background to said first masking plate,
- attaching said subject mask to said background transparency and orienting said first masking plate so that said subject mask is aligned with the projection of said subject through the lens of said camera,
- attaching said background mask to said second masking plate and orienting said second masking plate so that said background mask is aligned with the projection of said subject through the lens of said camera,
- rotating said second masking plate into alignment against said film plate and exposing the film negative to said subject, and
- rotating said first masking plate into alignment against said film plate and exposing the film negative to a source of white light.

9. The method of claim 8 wherein the step of creating said subject and background masks comprises the steps of taking a photograph of the subject utilizing positive type film, placing a piece of tracing paper over the developed photograph, cutting the tracing paper around the outline of the subject and applying an opaque coating to the two resulting pieces of tracing paper.

10. A photographic apparatus for adding an artificial background to the photograph of a subject during the photographic process, including:
- a camera having a film plate and a lens and shutter for controlling the exposure of said film plate;
- a masking plate positionable in an operative position against said film plate and adapted to receive a subject mask;
- registration means for controlling the orientation of said masking plate relative to said film plate so that said mask can be aligned with the projection of said subject through the lens of said camera when said masking plate is in said operative position; and
- said registration means comprising a plurality of control knobs, a plurality of pinion gear means attached to and rotatably controlled by said control knobs and a plurality of rack gear means attached to said transmission means and operably associated with a corresponding pinion gear means.

* * * * *